(12) United States Patent
Wu

(10) Patent No.: US 11,895,276 B2
(45) Date of Patent: Feb. 6, 2024

(54) METHOD, APPARATUS, AND SYSTEM FOR CONTROLLING VOICE PRINT

(71) Applicant: Zhuhai Pantum Electronics Co., Ltd., Zhuhai (CN)

(72) Inventor: Weixin Wu, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 17/700,777

(22) Filed: Mar. 22, 2022

(65) Prior Publication Data

US 2022/0311885 A1 Sep. 29, 2022

(30) Foreign Application Priority Data

Mar. 26, 2021 (CN) .......................... 202110324940.6

(51) Int. Cl.
*H04N 1/00* (2006.01)
*G06F 21/32* (2013.01)
*G06F 3/12* (2006.01)

(52) U.S. Cl.
CPC ....... *H04N 1/00403* (2013.01); *G06F 3/1204* (2013.01); *G06F 3/1253* (2013.01); *G06F 3/1265* (2013.01)

(58) Field of Classification Search
CPC . H04N 1/00403; G06F 3/1204; G06F 3/1253; G06F 3/1265
USPC ....................................................... 358/1.15
See application file for complete search history.

(56) References Cited

U.S. PATENT DOCUMENTS

| 6,947,156 | B1* | 9/2005 | Jeyachandran | ........... G06F 3/00 358/1.15 |
| 11,163,526 | B2* | 11/2021 | Tomioka | ................ G06F 3/1204 |
| 2003/0007178 | A1* | 1/2003 | Jeyachandran | ........ G06K 15/00 710/39 |
| 2008/0030770 | A1* | 2/2008 | Nishioka | ............... G06F 3/1288 358/1.15 |
| 2012/0240045 | A1* | 9/2012 | Bradley | ............... G09B 21/006 715/716 |
| 2019/0068809 | A1 | 2/2019 | Shiga et al. | |
| 2019/0278564 | A1* | 9/2019 | Matsuo | .................... G10L 15/26 |
| 2019/0318724 | A1* | 10/2019 | Chao | ....................... G10L 15/22 |
| 2020/0177407 | A1 | 6/2020 | Nakamura | |
| 2020/0280646 | A1* | 9/2020 | Onishi | .................. G06F 3/1257 |
| 2020/0404110 | A1* | 12/2020 | Fujisawa | ............... G06F 3/1204 |

FOREIGN PATENT DOCUMENTS

| CN | 110609662 A | 12/2019 |
| CN | 111756944 A | 10/2020 |
| KR | 20200072105 A | 6/2020 |

* cited by examiner

Primary Examiner — Allen H Nguyen
(74) Attorney, Agent, or Firm — ANOVA LAW GROUP, PLLC

(57) ABSTRACT

Embodiments of the present disclosure provide a method, an apparatus, and a storage medium for controlling voice print. The method includes receiving keyword information extracted from voice information by a voice processing apparatus; obtaining a target print document according to the keyword information; obtaining print configuration information according to the keyword information; and transmitting the target print document and the print configuration information to a target image forming apparatus.

17 Claims, 7 Drawing Sheets

METHOD, APPARATUS, AND SYSTEM FOR CONTROLLING VOICE PRINT

CROSS-REFERENCE TO RELATED APPLICATION

This application claims the priority to Chinese patent application No. 202110324940.6, filed on Mar. 26, 2021, in the China National Intellectual Property Administration, the entirety of which is incorporated herein by its reference.

TECHNICAL FIELD

The present disclosure generally relates to the field of printing technology and, more particularly, relates to a method, an apparatus, and a system for controlling voice print.

BACKGROUND

With development of electronic information technology and diversification of human-computer interaction manners, the demand for intelligent printing becomes higher, and voice print devices based on voice control have emerged. However, printing may be achieved by an existing voice print device which requires multiple voice interactions between a user and the print device. For example, printing a job may require multiple confirmations back-and-forth, and the interaction process may be cumbersome, resulting in following disadvantages. On the one hand, the printing speed is affected, which may not meet high efficiency requirement of print devices; on the other hand, multiple voice interactions increase the possibility of voice transmission errors, which may not meet easy use requirement of print devices.

SUMMARY

One aspect of the present disclosure provides a method for controlling voice print. The method includes receiving keyword information extracted from voice information by a voice processing apparatus; obtaining a target print document according to the keyword information; obtaining print configuration information according to the keyword information; and transmitting the target print document and the print configuration information to a target image forming apparatus.

Another aspect of the present disclosure provides an apparatus for controlling voice print. The apparatus includes a memory, storing a computer program for performing a method for controlling voice print; and a processor, coupled with the memory and when the computer program being executed, configured to: receive keyword information extracted from voice information by a voice processing apparatus; obtain a target print document according to the keyword information; obtain print configuration information according to the keyword information; and transmit the target print document and the print configuration information to a target image forming apparatus.

Another aspect of the present disclosure provides a non-transitory computer-readable storage medium containing a computer program, where when being executed, the computer program causes a processor to perform a method for controlling voice print. The method includes receiving keyword information extracted from voice information by a voice processing apparatus; obtaining a target print document according to the keyword information; obtaining print configuration information according to the keyword information; and transmitting the target print document and the print configuration information to a target image forming apparatus.

Other aspects of the present disclosure can be understood by those skilled in the art in light of the description, the claims, and the drawings of the present disclosure.

BRIEF DESCRIPTION OF THE DRAWINGS

To clearly describe the technical solutions of various embodiments of the present disclosure, the drawings which need to be used for describing various embodiments are described below. Obviously, the drawings in the following description are merely some embodiments of the present disclosure. For those skilled in the art, other drawings may be obtained in accordance with these drawings without creative efforts.

DETAILED DESCRIPTION

To better understand the present disclosure, the present disclosure is described below with reference to related drawings. Optional embodiments of the present disclosure are shown in drawings. However, the present disclosure is implemented in various different forms and is not limited to embodiments described herein. On the contrary, embodiments are provided for a thorough and complete understanding of the present disclosure.

Unless otherwise defined, all technical and scientific terms used herein have the same meanings as those commonly understood by those skilled in the art. Terms used in the specification the present disclosure are for the purpose of describing particular embodiments only and are not intended to limit the present disclosure.

Figure 1:
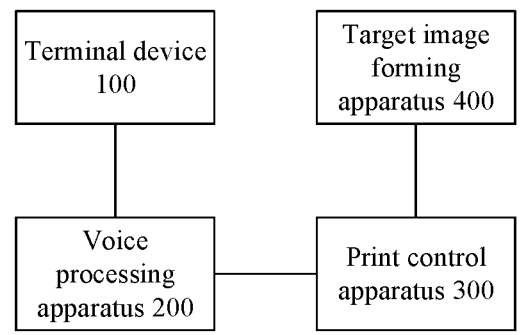
FIG. 1 illustrates a structural schematic of a system for controlling voice print provided by exemplary embodiments of the present disclosure.

Referring to FIG. 1, FIG. 1 illustrates a structural schematic of a system for controlling voice print provided by exemplary embodiments of the present disclosure. The system for controlling voice print may include a terminal device 100, a voice processing apparatus 200, a print control apparatus 300, and a target image forming apparatus 400. The target image forming apparatus 400 may be configured to perform image-forming processing operations. The target image forming apparatus 400 may include, but not be limited to, a printer, a copier, a scanner, a facsimile machine, a multifunction machine or a compound machine which combine above-mentioned functions, or the like.

Figure 2:
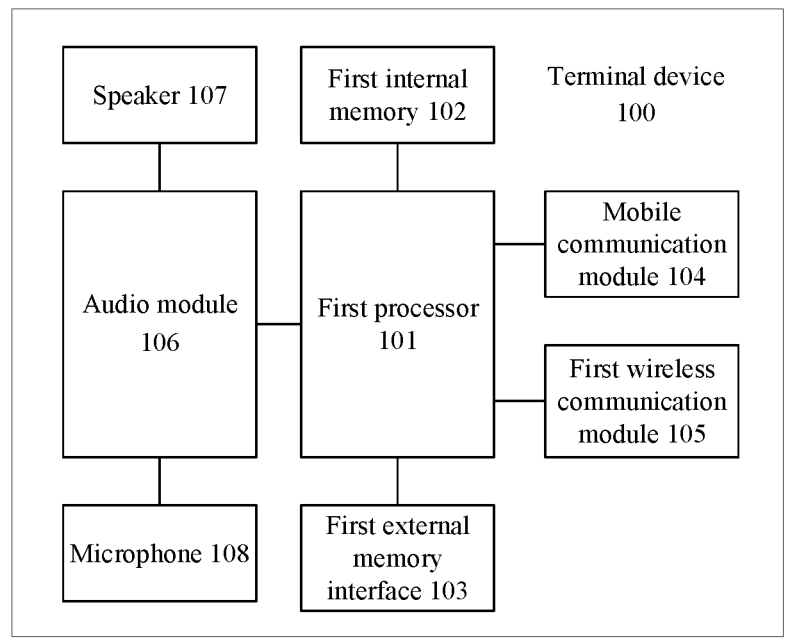
FIG. 2 illustrates a structural schematic of a terminal device provided by exemplary embodiments of the present disclosure.

Referring to FIG. 2, the terminal device 100 may include a first processor 101, a first internal memory 102, a first external memory interface 103, a mobile communication module 104, a first wireless communication module 105, an audio module 106, a speaker 107, and a microphone 108.

It can be understood that the structures illustrated in embodiments of the present disclosure may not limit the terminal device 100. In other embodiments of the present disclosure, the terminal device 100 may include more or less components in FIG. 2, or combine some components, or separate some components, or arrange different components. The components in FIG. 2 may be implemented in hardware, software, or a combination of software and hardware.

The first processor 101 may include one or more processing units. For example, the first processor 101 may include an application processor (AP), a modulation/demodulation processor, a graphics processing unit (GPU), an image signal processor (ISP), a controller, a video codec, a digital signal processor (DSP), a baseband processor, a neural-network processing unit (NPU), and/or the like. Different processing units may be independent devices or may be integrated in one or more first processors 101.

The controller may generate an operation control signal according to an instruction operation code and a timing signal and complete the control of fetching and executing instructions.

Memory may also be configured in the first processor 101 for storing instructions and data. In some embodiments, the memory in the first processor 101 may be high-speed cache memory which may store instructions or data that have just been used or cyclically used by the first processor 101. If the first processor 101 needs to use the instructions or data again, the instructions or data may be called directly from the memory, which may avoid repeated access and reduce the waiting time of the first processor 101, thereby improving system efficiency.

In some embodiments, the first processor 101 may include one or more interfaces. The interfaces may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus that includes a serial data line (SDA) and a serial clock line (SCL). In some embodiments, the first processor 101 may contain multiple sets of I2C buses. The first processor 101 may be coupled to a camera, an indicator light and the like through different I2C bus interfaces, respectively. For example, the first processor 101 may be coupled to a camera through the I2C interface, so that the first processor 101 and the camera may communicate with the camera through the I2C bus interface, thereby implementing the camera function of the terminal device 100.

The I2S interface may be configured for audio communication. In some embodiments, the first processor 101 may contain multiple sets of I2S buses. The first processor 101 may be coupled to the audio module 106 through an I2S bus, thereby implementing communication between the first processor 101 and the audio module 106. In some embodiments, the audio module 106 may transmit audio signals to the first wireless communication module 105 through the I2S interface, thereby implementing the function of answering calls through a Bluetooth headset.

The PCM interface may also be configured for audio communication, sampling, quantizing and encoding analog signals. In some embodiments, the audio module 106 and the first wireless communication module 105 may be coupled through a PCM bus interface. In some embodiments, the audio module 106 may also transmit audio signals to the first wireless communication module 105 through the PCM interface, thereby implementing the function of answering calls through a Bluetooth headset. Both the I2S interface and the PCM interface may be configured for audio communication.

The UART interface is a universal serial data bus used for asynchronous communication. The bus may be a bidirectional communication bus. The UART interface may convert data to be transmitted between serial communication and parallel communication. In some embodiments, the UART interface may be normally configured to connect the first processor 101 and the first wireless communication module 105. For example, the first processor 101 may communicate with a Bluetooth module in the first wireless communication module 105 through the UART interface, thereby implementing the Bluetooth function. In some embodiments, the audio module 106 may transmit audio signals to the first wireless communication module 105 through the UART interface, thereby implementing the function of playing music through a Bluetooth headset.

The MIPI interface may be configured to connect the first processor 101 with peripheral devices such as a camera, a display screen, and the like.

The GPIO interface may be configured by software. The GPIO interface may be configured for transmitting a control signal or as a data signal. In some embodiments, the GPIO interface may be configured to connect the first processor 101 with a camera, a display screen, and/or the like. The GPIO interface may also be configured as I2C interface, I2S interface, UART interface, MIPI interface, and/or the like.

The USB interface, an interface that is consistent with the USB standard specification, may be a Mini USB interface, a Micro USB interface, a USB Type C interface, or the like. The USB interface may be configured to be connected to a charger to charge the terminal device 100, configured to transmit data between the terminal device 100 and peripheral devices and may also be configured to be connected to a headphone to play audio through the headphone. The interface may also be configured to be connected to other terminal devices 100, such as AR devices and/or the like.

Above-mentioned first processor 101 may be a central processing unit (CPU).

It can be understood that the interface connection relationship between the modules illustrated in embodiments of the present disclosure may merely exemplary and may not limit the structure of the terminal device 100. In other embodiments of the present disclosure, the terminal device 100 may also adopt different interface connection manners in above-mentioned embodiments, or a combination of multiple interface connection manners.

The first internal memory 102 may be configured to store computer executable program code including instructions. The first internal memory 102 may include a program storage region and a data storage region. The program storage region may store an operating system, an application program required for at least one function (such as a sound playback function, an image playback function, etc.), and the like. The data storage region may store data (such as audio data, phone book, etc.) created during the use of the terminal device 100 and the like. The first internal memory 102 may include a random-access memory (RAM) and may also include a read-only memory (ROM), a non-volatile memory, and/or the like. The first processor 101 may execute various functional applications and data processing of the terminal device 100 by executing the instructions stored in the first internal memory 102 and/or the instructions stored in the memory provided in the first processor 101.

The first external memory interface 103 may be configured to be connected to an external memory card, such as a Micro SD card, to expand the storage capacity of the terminal device 100. The external memory card may communicate with the first processor 101 through the first external memory interface 103 to implement data storage function, for example, saving files like music, video, and the like in external memory card.

The mobile communication module 104 may provide wireless communication solutions, including 2G/3G/4G/5G and the like, applied on the terminal device 100. The mobile communication module 104 may include at least one of a filter, a switch, a power amplifier, a low noise amplifier (LNA), and the like. The mobile communication module 104 may receive an electromagnetic wave through an antenna, perform filtering, amplifying and the like on the received electromagnetic wave, and transmit the electromagnetic wave to a modulation/demodulation processor for demodulation. The mobile communication module 104 may also amplify the signal modulated by the modulation/demodulation processor, and the signal may be converted into an electromagnetic wave which is radiated out through the antenna. In some embodiments, at least a part of functional modules of the mobile communication module 104 may be configured in the first processor 101. In some embodiments, at least a part of functional modules of the mobile communication module 104 may be configured in a same device as at least a part of modules of the first processor 101.

The first wireless communication module 105 may provide wireless communication solutions applied on the terminal device 100, including wireless local area networks (WLAN) (e.g., wireless fidelity (Wi-Fi) networks), Bluetooth (BT), global navigation satellite system (GNSS), frequency modulation (FM), near field communication technology (NFC), infrared (IR) technology, and/or the like. The first wireless communication module 105 may be one or more devices integrating at least one communication processing module. The first wireless communication module 105 may receive an electromagnetic wave through another antenna, perform frequency modulation and filtering on electromagnetic wave signals, and transmit the processed signals to the first processor 101. The first wireless communication module 105 may also receive a signal to be transmitted from the first processor 101, perform frequency modulation and amplifying on the signal to be transmitted, and convert the processed signal into an electromagnetic wave which is radiated out through the antenna.

The terminal device 100 may implement audio functions through an audio module 106, a speaker 107, a microphone 108, an application processor, and/or the like.

The audio module 106 may be configured for converting digital audio signals into analog audio signals for being outputted, and for converting inputted analog audio signals into digital audio signals. The audio module 106 may also be configured to encode and decode audio signals. In some embodiments, the audio module 106 may be configured in the first processor 101, or some functional modules of the audio module 106 may be configured in the first processor 101.

The speaker 107 may be configured to convert audio electrical signals into voice signals. The terminal device 100 may listen to music through the speaker 107 or listen hands-free calls.

The microphone 108 may be configured to convert voice signals into electrical signals. When making a call or sending a voice message, the user may speak by approaching the microphone 108 through a human mouth and input the voice signals into the microphone 108. The terminal device 100 may be configured with at least one microphone 108. In other embodiments, the terminal device 100 may be configured with two microphones 108, which may implement a noise reduction function in addition to collecting voice signals. In other embodiments, the terminal device 100 may further be configured with three, four or more microphones 108 to collect voice signals, reduce noise, identify voice sources, and implement directional recording functions, and/or the like.

The terminal device 100 may be, but not be limited to, a mobile phone, a tablet computer, a palmtop computer, and/or the like.

Figure 3:
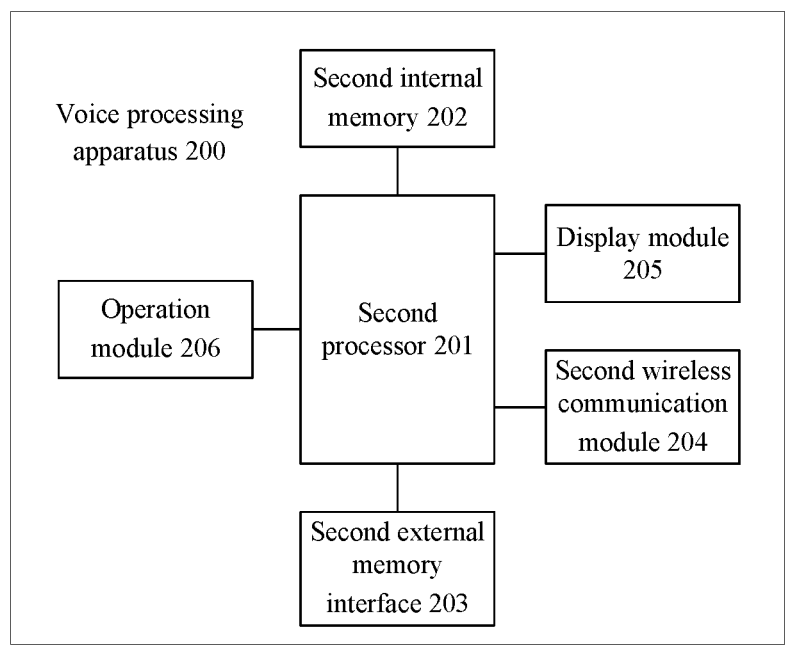
FIG. 3 illustrates a structural schematic of a voice processing apparatus provided by exemplary embodiments of the present disclosure.

Referring to FIG. 3, the voice processing apparatus 200 may include a second processor 201, a second internal memory 202, a second external memory interface 203, a second wireless communication module 204, a display module 205, and an operation module 206.

It can be understood that the structures illustrated in embodiments of the present disclosure may not limit the voice processing apparatus 200. In other embodiments of the present application, the voice processing apparatus 200 may include more or less components than shown in FIG. 3, or combine some components, or separate some components, or arrange different components.

The components in FIG. 3 may be implemented in hardware, software, or a combination of software and hardware.

The second processor 201 may include one or more processing units. For example, the second processor 201 may include an application processor (AP), a modulation/demodulation processor, a graphics processing unit (GPU), an image signal processor (ISP), a controller, a video codec, a digital signal processor (DSP), a baseband processor, a neural-network processing unit (NPU), and/or the like. Different processing units may be independent devices or may be integrated in one or more second processors 201.

Memory may also be configured in the second processor 201 for storing instructions and data. In some embodiments, the memory in the second processor 201 may be high-speed cache memory which may store instructions or data that have just been used or cyclically used by the second processor 201. If the second processor 201 needs to use the instructions or data again, the instructions or data may be called directly from the memory, which may avoid repeated access and reduce the waiting time of the second processor 201, thereby improving system efficiency.

In some embodiments, the second processor 201 may include one or more interfaces. The interfaces may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like, which may not be described in detail herein.

The second processor 201 may be a central processing unit.

It can be understood that the interface connection relationship between the modules illustrated in embodiments of the present disclosure may be merely exemplary and may not limit the structure of the voice processing apparatus 200. In other embodiments of the present disclosure, the voice processing apparatus 200 may also adopt different interface connection manners in above-mentioned embodiments, or a combination of multiple interface connection manners.

The second internal memory 202 may be configured to store computer executable program code including instructions. The second internal memory 202 may include a program storage region and a data storage region. The program storage region may store an operating system, an application program required for at least one function (such as a sound playback function, an image playback function, and the like), and the like. The data storage region may store data (such as audio data, phone book, and the like) created during the use of the terminal device 100 and the like. The second internal memory 202 may include a random-access memory (RAM) and may also include a read-only memory (ROM), a non-volatile memory, and/or the like. The second processor 201 may execute various functional applications and data processing of the terminal device 100 by executing the instructions stored in the second internal memory 202 and/or the instructions stored in the memory provided in the second processor 201.

The second external memory interface 203 may be configured to connect an external memory card, such as a Micro SD card, to expand the storage capacity of the terminal device 100. The external memory card may communicate with the second processor 201 through the second external memory interface 203 to implement data storage function, for example, saving files like music, video, and the like in external memory card.

The second wireless communication module 204 may provide wireless communication solutions applied to the voice processing apparatus 200, including Internet, wireless local area network, Bluetooth, GNSS, frequency modulation, short-range wireless communication technology, infrared technology, and/or the like. The second wireless communication module 204 may be one or more devices integrating at least one communication processing module.

The display module 205 may be a display screen. The display module 205 may be configured to display images, videos, and the like. The display module 205 may include a display panel. The display panel may be a liquid crystal display (LCD), an organic light-emitting diode (OLED) display, an active-matrix organic light emitting diode (AMOLED) display, a flexible light-emitting diode (FLED) display, a Mini-LED display, a Micro-LED display, a Micro-OLED display, a quantum dot light emitting diode (QLED) display, and/or the like. In some embodiments, the voice processing apparatus 200 may include one or N display modules 205, where N is a positive integer greater than one.

The operation module 206 may be configured to receive user operations. The voice processing apparatus 200 may receive operation inputs and generate operation signal inputs related to user setting and function control of the voice processing apparatus 200.

The mobile communication module 104 and the first wireless communication module 105 of the terminal device 100 may be communicatively connected with the second wireless communication module 204 of the voice processing apparatus 200.

The functions of the terminal device 100, the voice processing apparatus 200, the print control apparatus 300, and the target image forming apparatus 400 are described below with reference to embodiments.

Figure 4:
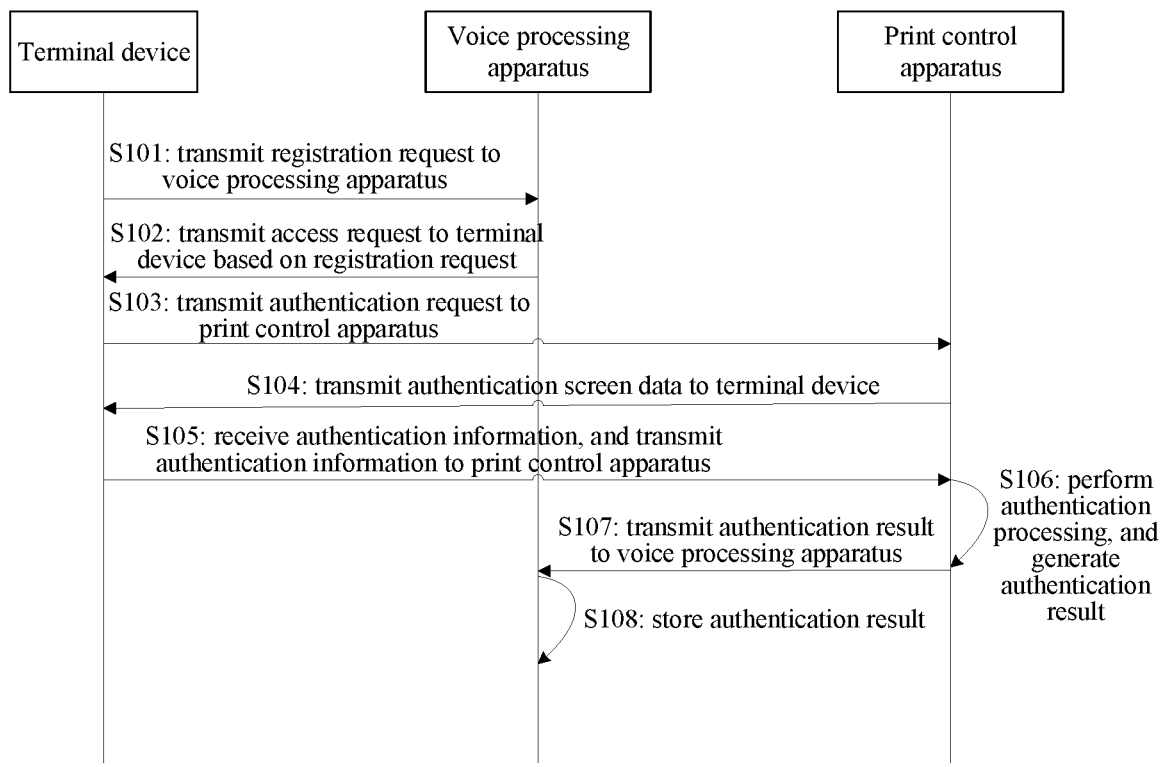
FIG. 4 illustrates a schematic flowchart of a method for associating a terminal device and a target image forming apparatus provided by exemplary embodiments of the present disclosure.

Referring to FIG. 4, a method for associating the terminal device 100 and the target image forming apparatus 400 is provided by exemplary embodiments of the present disclosure. The association method may include following exemplary steps.

At S101, a registration request may be transmitted to the voice processing apparatus.

The terminal device 100 may transmit the registration request of the user. Such registration request is a request for registering print service in the print control apparatus 300. The user may log in a management account on the terminal device 100 and make the registration request based on the management account, so that the voice processing apparatus 200 may identify the management account that makes the registration request. For example, the user may log in to the management account on an application program installed on the terminal device 100 or a webpage of a web browser and submit the registration request.

At S102, an access request may be transmitted to the terminal device based on the registration request.

After the voice processing apparatus 200 receives the registration request transmitted by the terminal device 100, the voice processing apparatus 200 may transmit the access request configured to authenticate the uniform resource locator (URL) of the print control apparatus 300 to the terminal device 100.

At S103, an authentication request may be transmitted to the print control apparatus.

After receiving the access request transmitted by the voice processing apparatus 200, the terminal device 100 may transmit the authentication request to the print control apparatus 300 using the specified URL.

At S104, authentication screen data may be transmitted to the terminal device.

After receiving the authentication request transmitted by the terminal device 100, the print control apparatus 300 may transmit the authentication screen to the terminal device 100, and the terminal device 100 may receive and display the authentication screen. The user may enter authentication information through the authentication screen. The authentication information may be, for example, a user's account and a password corresponding to the user's account.

At S105, the authentication information may be received; and the authentication information may be transmitted to the print control apparatus.

The terminal device 100 may receive the authentication information inputted by the user and transmit the authentication information to the print control apparatus 300.

At S106, authentication processing may be performed, and an authentication result may be generated.

The print control apparatus 300 may execute authentication processing after receiving the authentication information transmitted by the terminal device 100. For example, a preset authentication list may be pre-stored in the print control apparatus 300; and the preset authentication list may include multiple pieces of preset authentication information. The print control apparatus 300 may compare received authentication information with the preset authentication information in the preset authentication list, determine whether the received authentication information is included in the preset authentication list, and return the authentication result to the voice processing apparatus 200. The preset authentication list may include preset user's accounts and preset passwords corresponding to the preset user's accounts. If the authentication information is included in the preset authentication list, the authentication result may include the authentication information. For example, if the user's account is consistent with one of the preset user's accounts, and the password corresponding to the user's account is consistent with the preset password corresponding to such preset user's account, the authentication information may be included in the preset authentication list. If the authentication information is not included in the preset authentication list, the authentication result may include authentication failure. For example, if the user's account is not a preset user's account in the preset authentication list, or if the user's account is a preset user's account in the preset authentication list, but the password corresponding to the user's account is not the preset password corresponding to such preset user's account, the authentication may fail.

At S107, the authentication result may be transmitted to the voice processing apparatus.

If the authentication information is included in the preset authentication list, the authentication may be successful; the print control apparatus 300 may transmit the authentication result to the voice processing apparatus 200; the voice processing apparatus 200 may obtain authentication information (such as an access token, etc.) for accessing the print control apparatus 300; and the voice processing apparatus 200 may access the print control apparatus 300 based on the authentication information. The print control apparatus 300 may identify the user's account that made the print service request based on the authentication information, thereby identifying the image forming apparatus associated with the user's account.

If the authentication information is not included in the preset authentication list, the authentication may fail, and the print control apparatus 300 may transmit the authentication failure information to the terminal device 100. The user may re-enter the authentication information according to the authentication failure information.

At S108, the authentication result may be stored.

For example, the voice processing apparatus 200 may store received authentication result in the second internal memory 202; and in addition to the authentication information, the authentication result may also include an access token and a refresh token.

The access token and refresh token may have an infinite validity period or may be considered to have an infinite validity period. Based on the access token, the voice processing device 200 may identify corresponding user's account. The voice processing device 200 may also identify the management account that made the registration request. Therefore, the voice processing apparatus 200 may store the authentication information and the management account corresponding to the authentication information, which are associated with each other, in the second internal memory 202. The user's account is associated with the image forming apparatus, such that the user's account, the management account and the image forming apparatus may be associated with each other. The print control apparatus 300 may obtain the association information between the user's account, the management account and the image forming apparatus through mutual communication with the voice processing apparatus 200.

Figure 5:
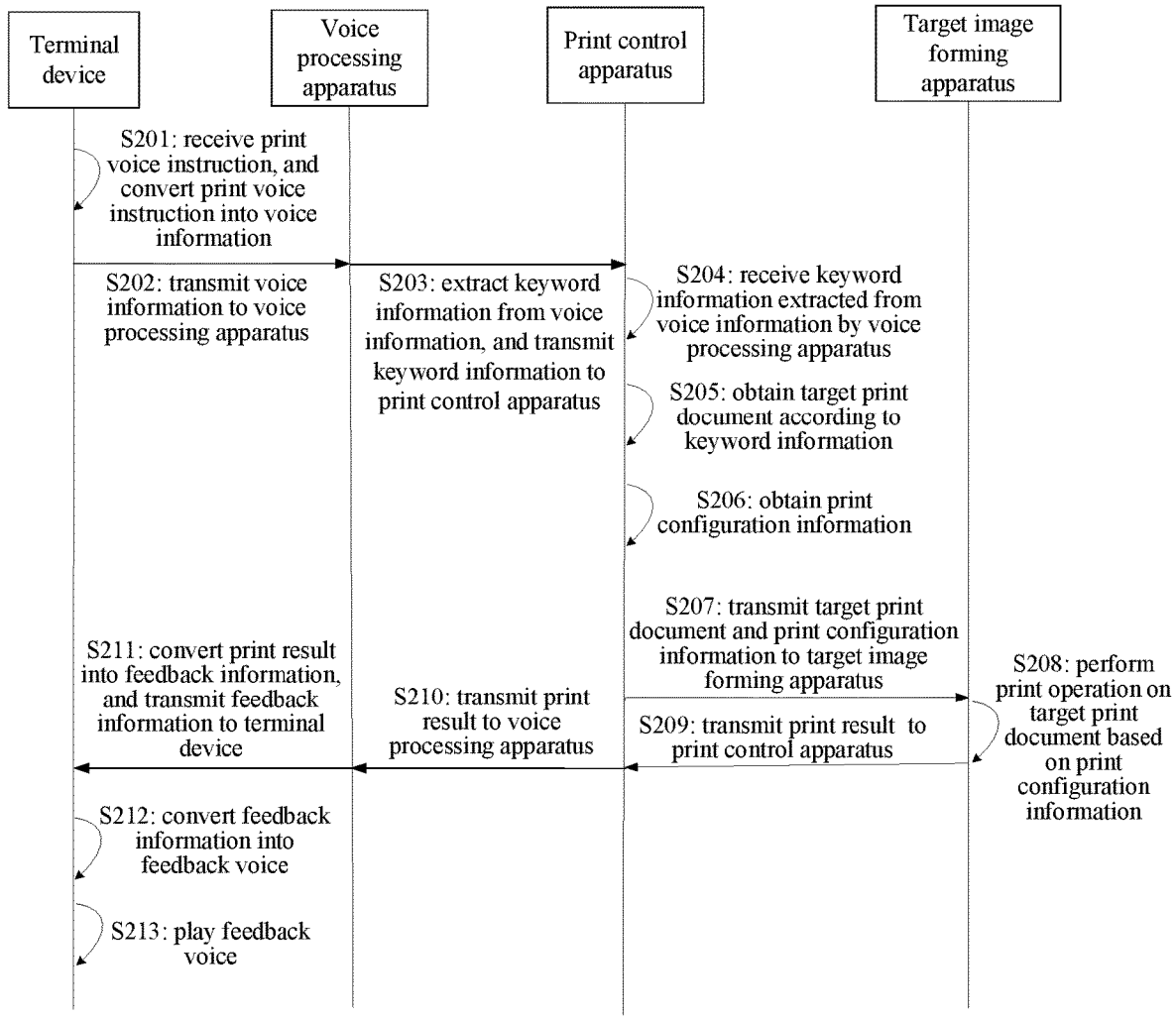
FIG. 5 illustrates a schematic flowchart of a method for controlling voice print provided by exemplary embodiments of the present disclosure.

FIG. 5 provides a method for controlling voice print provided by exemplary embodiments of the present disclosure. The method for controlling voice print may include following exemplary steps.

At S201, a print voice instruction may be received, and the print voice instruction may be converted into voice information.

For example, the microphone 108 of the terminal device 100 may receive the voice of the user, thereby obtaining the print voice instruction. The terminal device 100 may also obtain voice data by receiving text or pictures inputted by the user. The user may also activate the function of receiving voice by activating the button configured on the terminal device 100, and the user may issue print voice instructions such as "start printing" or "print two English test tests".

The audio module 106 and the first processor 101 of the terminal device 100 may convert the print voice instruction or the voice data into voice information.

At S202, the voice information may be transmitted to the voice processing apparatus.

For example, the mobile communication module 104 or the first wireless communication module 105 of the terminal device 100 may transmit the voice information to the second wireless communication module 204 of the voice processing apparatus 200. After receiving the voice information, the second wireless communication module 204 may store the voice information in the second internal memory 202. The second processor 201 may obtain the voice information from the second internal memory 202, and extract keyword information from the voice information.

At S203, keyword information may be extracted from the voice information; and the keyword information may be transmitted to the print control apparatus.

The second wireless communication module 204 of the voice processing apparatus 200 may transmit the keyword information extracted by the second processor 201 to the print control apparatus 300.

At S204, the keyword information extracted from the voice information may be received by the voice processing apparatus.

The print control apparatus 300 may receive the keyword information transmitted by the voice processing device 200.

At S205, a target print document may be obtained according to the keyword information.

A plurality of documents to be printed may be pre-stored in the print control apparatus 300. The documents to be printed may be downloaded by the print control apparatus 300 through the network or obtained by the print control apparatus 300 through an external memory or transmitted to the print control apparatus 300 by the terminal device 100.

At S206, print configuration information may be obtained.

The print configuration information may be obtained by the print control apparatus 300 according to the keyword information; or may be pre-stored in the print control apparatus 300.

At S207, the target print document and the print configuration information may be transmitted to the target image forming apparatus.

The print control apparatus 300 may transmit the target print document and the print configuration information to the target image forming apparatus 400.

At S208, a print operation may be performed on the target print document based on the print configuration information.

The target image forming apparatus 400 may analyze a received target print document and perform the print operation on the analyzed target print document according to the print configuration information.

At S209, a print result may be transmitted to the print control apparatus.

The target image forming apparatus 400 may transmit the print result to the print control apparatus 300. The print results may be, for example, "printing started", "printing", "paper jam", "out of paper", "printing completed", and/or the like.

At S210, the print result may be transmitted to the voice processing apparatus.

The print control apparatus 300 may transmit the print result received from the target image forming apparatus 400 to the voice processing apparatus 200. After the print control apparatus 300 transmits the target print document and the print configuration information to the target image forming apparatus 400, the print control apparatus 300 may also automatically transmit a signal, characterizing that the target print document and the print configuration information have been transmitted to the target image forming apparatus 400, to the voice processing apparatus 200. Or, after receiving the target print document and the print configuration information, the target image forming apparatus 400 may return a signal, characterizing that the target print document and print configuration information have been received, to the print control apparatus 300, where the signal may be configured as the print result which is transmitted to the voice processing device 200.

At S211, the print result may be converted into feedback information; and the feedback information may be transmitted to the terminal device.

The voice processing apparatus 200 may convert the received print result into the feedback information which is transmitted to the terminal device 100.

At S212, the feedback information may be converted into feedback voice.

The first processor 101 and the audio module 106 of the terminal device 100 may convert the feedback information into the feedback voice.

At S213, the feedback voice may be played.

The terminal device 100 may play the feedback voice through the speaker 107, so that the user may know the printing status through the feedback voice or perform further operations according to the feedback voice.

According to the method for controlling voice print at the present disclosure, the keyword information extracted from the voice information by the voice processing apparatus 200 may be received; the target print document and the print configuration information may be obtained according to the keyword information; and the target print document and the print configuration information may be transmitted to the target image forming apparatus 400. In above-mentioned method, the target print document may be obtained according to the keyword information; and the print configuration information may be obtained according to the keyword information or according to preset stored information. Therefore, there is no need for the user to repeatedly reply to the voice for confirmation, the user may only need to send one print voice instruction to make the print device perform the print operation, and the interaction process may be simple, which greatly improves print efficiency. In addition, for multiple voices transmitted back and forth, if one of the voices is inaccurately converted, printing errors may be caused. Therefore, compared with the existing technology, using only one print voice instruction may reduce printing errors caused by inaccurate voice conversion. Moreover, even if there is an abnormal situation in the print device, the user may be informed by voice in time, which may make remote printing more convenient and reliable.

Figure 6:
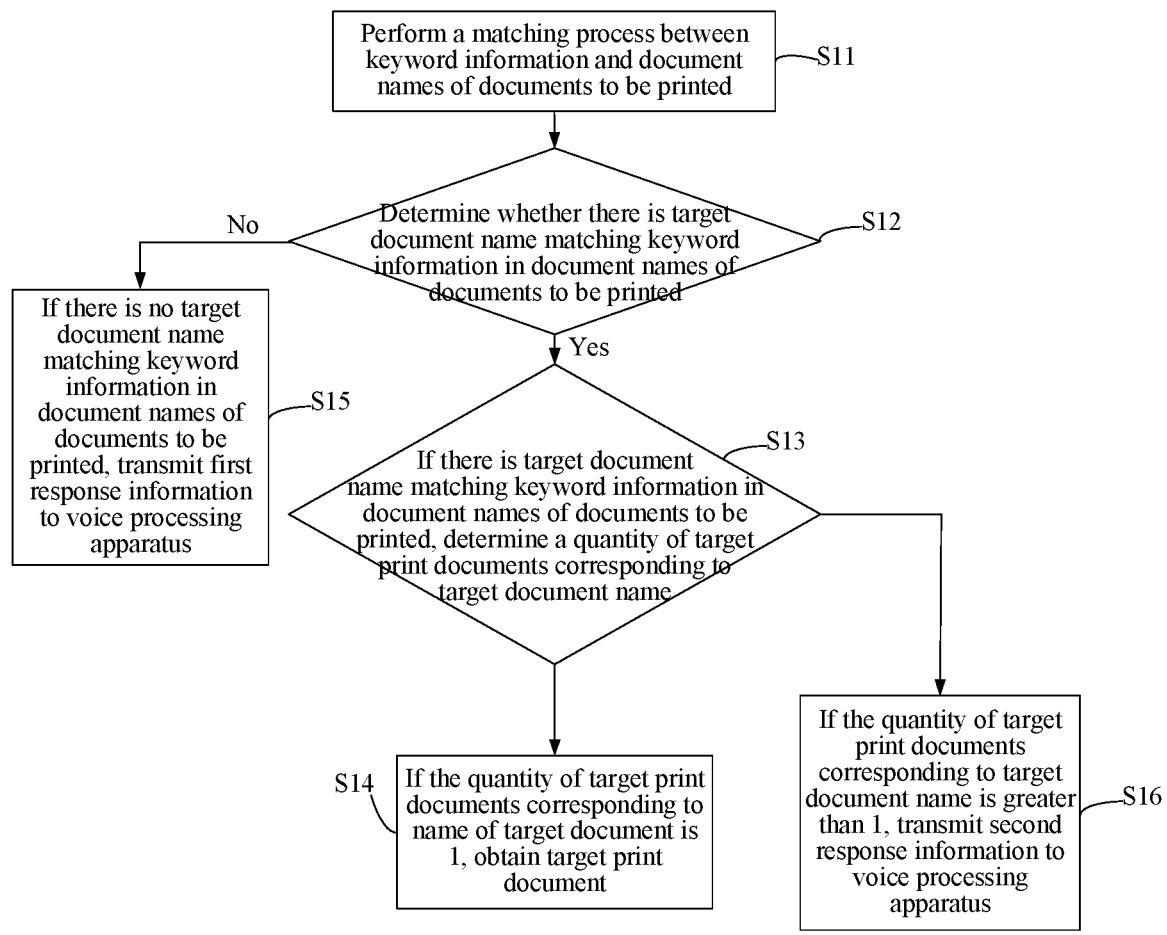
FIG. 6 illustrates a sub-flowchart of a method for controlling voice print in FIG. 5.

Referring to FIG. 6, furthermore, S205 of obtaining the target print document according to the keyword information may include following exemplary steps.

At S11, a matching process may be performed between the keyword information and document names of the documents to be printed.

The matching process may be performed, by the print control apparatus 300, between the keyword information and the document names of multiple documents to be printed that are pre-stored in the print control apparatus 300.

At S12, it may determine whether there is a target document name matching the keyword information in the document names of the documents to be printed.

At S13, if there is a target document name matching the keyword information in the document names of the documents to be printed, it may determine the quantity of target print documents corresponding to the target document name.

The keyword information may be, for example, "print", "two copies", and "English test paper". The print control apparatus 300 may match "print", "two copies", and "English test paper" with the document names of multiple documents to be printed stored in the print control apparatus 300, and search whether there is a target document name matching "print", "two copies", and "English test paper".

If there is a document to be printed whose document name is "English test paper", then "English test paper" may be the target document name matching the keyword information "print", "two copies", and "English test paper". The quantity of target print documents corresponding to the target document name may be one or more. Therefore, the quantity of target print documents corresponding to the target document name may be further determined.

At S14, if the quantity of target print documents corresponding to the target document name is 1, the target print document may be obtained.

If the quantity of target print documents corresponding to the target document name is 1, that is, if the quantity of target print documents corresponding to the target document name is one, the print control apparatus 300 may obtain the target print document.

By performing the matching process between the keyword information and the document names of the documents to be printed, the target print document matching the keyword information may be selected from the documents to be printed; and if the quantity of target print documents is 1, the target print document may be obtained, thereby obtaining the target print document quickly and accurately.

At S15, if there is no target document name matching the keyword information in the document names of the documents to be printed, the first response information may be transmitted to the voice processing apparatus.

If there is no target document name matching the keyword information in the document names of the documents to be printed, that is, if the quantity of target print documents is 0, the print control apparatus 300 may transmit the first response information to the voice processing apparatus 200. The first response information may be configured to characterize that the target print document is not found according to the keyword information, and the first response information may be, for example, "corresponding document is not found".

The voice processing apparatus 200 may convert the first response information into the first response signal and transmit the first response signal to the terminal device 100;

and the terminal device 100 may convert the first response signal into the first response voice which may be played to inform the user.

If the target print document cannot be found according to the keyword information, the first response information may be transmitted to the voice processing apparatus 200; the voice processing apparatus 200 may convert the first response information into the first response signal and transmit the first response signal to the terminal device 100; and the terminal device 100 may convert the first response signal into the first response voice which may be played. Therefore, the user may re-transmit a print voice instruction according to the voice prompt in time, thereby finding the target print document for printing.

At S16, if the quantity of target print documents corresponding to the target document name is greater than 1, the second response information may be transmitted to the voice processing apparatus 200.

If the quantity of target print documents corresponding to the target document name is greater than 1, that is, if the quantity of target print documents searched according to the keyword information is more than two, in such case, the target document names of the target print documents may be close. The print control apparatus 300 may classify multiple documents to be printed with similar document names as target print documents, which may characterize that the keyword information is not sufficiently detailed. At this point, the print control apparatus 300 may not obtain the multiple target print documents and may transmit the second response information to the voice processing apparatus 200. The second response information may be configured to characterize that the quantity of target print documents corresponding to the target document name is greater than 1, and the second response information may be, for example, "please explain in more detail".

The voice processing apparatus 200 may convert the second response information into a second response signal and transmit the second response signal to the terminal device 100; and the terminal device 100 may convert the second response signal into the second response voice which may be played to inform the user.

If the quantity of target print documents searched according to the keyword information is greater than 1, the second response information may be transmitted to the voice processing apparatus 200; the voice processing apparatus 200 may convert the second response information into the second response signal and transmit the second response signal to the terminal device 100; and the terminal device 100 may convert the second response signal into the second response voice which may be played. Therefore, the user may re-transmit a print voice instruction according to the voice prompt in time, thereby finding the target print document for printing.

Figure 7:
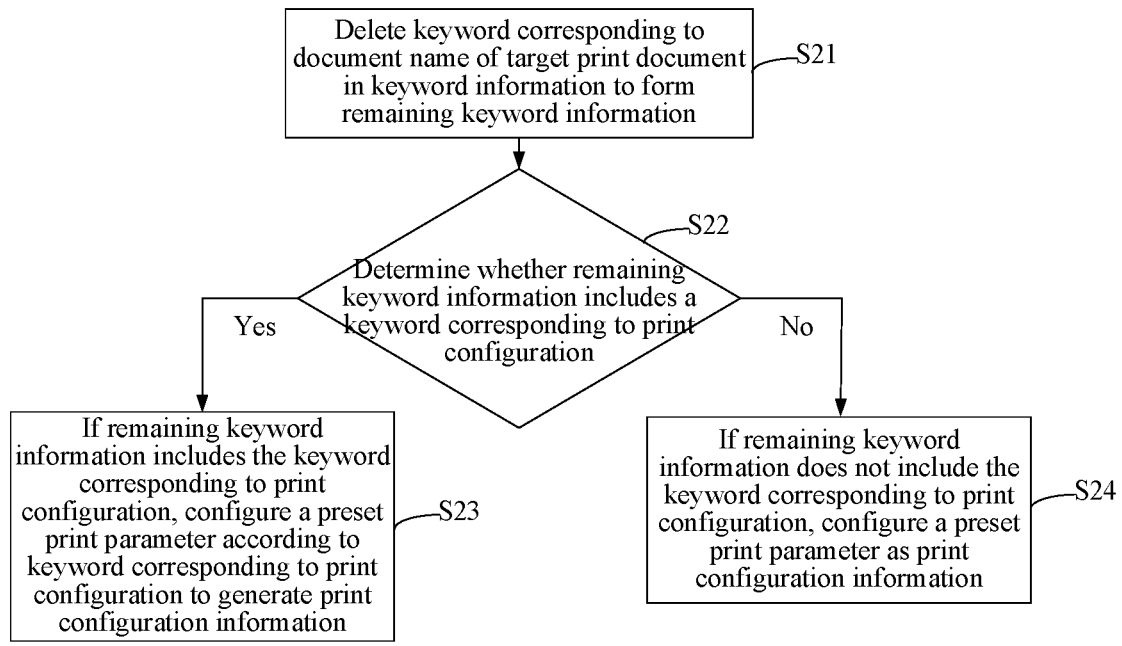
FIG. 7 illustrates another sub-flowchart of a method for controlling voice print in FIG. 5.

Referring to FIG. 7, furthermore, the keyword information may include a plurality of keywords. S206 of obtaining the print configuration information may include following exemplary steps.

At S21, the keyword corresponding to the document name of the target print document in the keyword information may be deleted to form remaining keyword information.

After the print control apparatus 300 searches the target print document, the keyword corresponding to the document name of the target print document in the keyword information may be deleted. For example, the keyword information may be "print", "3 copies", "A4 printer manual". "A4 printer manual" is the keyword corresponding to the document name of the target print document, then the keyword "A4 printer manual" in the keyword information may be deleted, which may avoid "A4" in the keyword from interfering determination of the print configuration information. After the keyword corresponding to the document name of the target print document is deleted from the keyword information, the remaining keyword information may be formed.

At S22, whether the remaining keyword information includes a keyword corresponding to the print configuration may be determined.

The keywords corresponding to the print configuration may be, for example, "copy", "A4", "page", and the like.

At S23, if the remaining keyword information includes the keyword corresponding to the print configuration, a preset print parameter may be configured according to the keyword corresponding to the print configuration to generate the print configuration information.

The preset print parameter may be the default print parameter pre-stored in the print control apparatus 300. If the remaining keyword information includes the keyword corresponding to the print configuration, the preset print parameter may need to be modified according to the keyword corresponding to the print configuration. For example, the remaining keyword information includes the keyword corresponding to the print configuration as "two copies", and the preset print parameter is "one copy", therefore the preset print parameter may need to be modified to "two copies", and the changed preset print parameter may be the print configuration information.

At S24, if the remaining keyword information does not include the keyword corresponding to the print configuration, a preset print parameter may be configured as the print configuration information.

If the remaining keyword information does not include the keyword corresponding to the print configuration, the default preset print parameter in the print control apparatus 300 may be configured as the print configuration information, so that the user may not need to re-confirm the print configuration information by voice.

The keyword corresponding to the document name of the target print document in the keyword information is deleted. Therefore, it may avoid the interference of the keyword corresponding to the document name of the target print document in the keyword information on obtaining the print configuration information, which may avoid errors of the print configuration information. If the remaining keyword information includes the keyword corresponding to the print configuration, the preset print parameter may be configured according to the keyword corresponding to the print configuration to generate the print configuration information, such that the print parameter may be configured according to the user's printing requirement. If the remaining keyword information does not include the keyword corresponding to the print configuration, the preset print parameter may be configured as the print configuration information, such that the user may not need to confirm the print information by voice back and forth, and errors may be avoided during the back-and-forth confirmation of the print information.

Furthermore, step S207 of transmitting the target print document and the print configuration information to the target image forming apparatus 400 may include that, according to the keyword information and a preset rule, the target image forming apparatus 400 may be determined from image forming apparatuses associated with the user's account; and the target print document and print configuration information may be transmitted to the target image forming apparatus 400.

The user may log in above-mentioned registered user's account on the terminal device 100; after the terminal device 100 receives the print voice instruction and converts the print voice instruction into the voice information, the terminal device 100 may transmit the voice information to the voice processing apparatus 200 based on the user's account; and the voice processing apparatus 200 may receive the voice information, determine the terminal device from which the voice information is transmitted and the user's login account, and obtain the image forming apparatus 400 associated with the user's account.

The print control apparatus 300 may also obtain the image forming apparatuses associated with the user's account through the keyword information. The quantity of the image forming apparatuses associated with the user's account may be multiple, and the print control apparatus 300 may determine the target image forming apparatus 400 from multiple associated image forming apparatuses according to a preset rule. The preset rule may include an associated chronological order of user's accounts and associated image forming apparatuses or a user-defined order.

The target image forming apparatus 400 is determined according to the keyword information and the preset rule, so that corresponding image forming apparatus may be selected to execute the print operation according to the user's printing requirement, and the print operations of the image forming apparatuses may be reasonably allocated, thereby improving the print efficiency.

Figure 8:
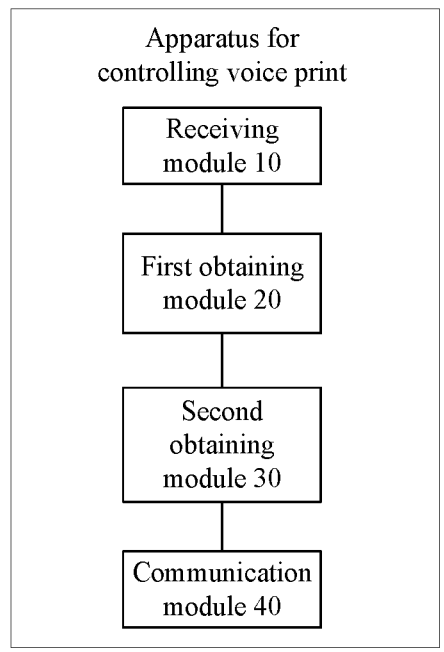
FIG. 8 illustrates a structural schematic of an apparatus for controlling voice print provided by exemplary embodiments of the present disclosure.

Referring to FIG. 8, various embodiments of the present application also provide an apparatus for controlling voice print. The apparatus for controlling voice print may include a receiving module 10, a first obtaining module 20, a second obtaining module 30, and a communication module 40. The receiving module 10 may be configured to receive the keyword information extracted from the voice information by the voice processing apparatus. The first obtaining module 20 may be configured to obtain the target print document according to the keyword information. The second obtaining module 30 may be configured to obtain the print configuration information according to the keyword information. The communication module 40 may be configured to transmit the target print document and the print configuration information to the target image forming apparatus.

Figure 9:
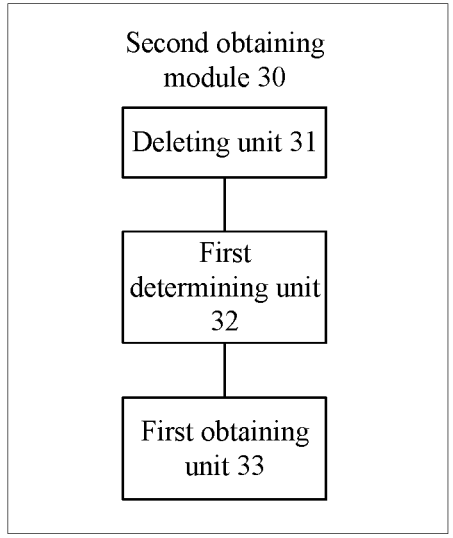
FIG. 9 illustrates a structural schematic of a second obtaining module provided by exemplary embodiments of the present disclosure.

Referring to FIG. 9, in one embodiment, the keyword information may include multiple keywords. The second obtaining module 30 may include a deleting unit 31, a first determining unit 32, and a first obtaining unit 33. The deleting unit 31 may be configured to delete the keyword corresponding to the document name of the target print document in the keyword information to form remaining keyword information. The first determining unit 32 may be configured to determine whether the remaining keyword information includes the keyword corresponding to the print configuration. If the remaining keyword information includes the keyword corresponding to the print configuration, the first obtaining unit 33 may be configured to set the preset print parameter according to the keyword corresponding to the print configuration to generate the print configuration information. If the remaining keyword information does not include the keyword corresponding to the print configuration, the first obtaining unit 33 may configure the preset print parameter as the print configuration information.

Figure 10:
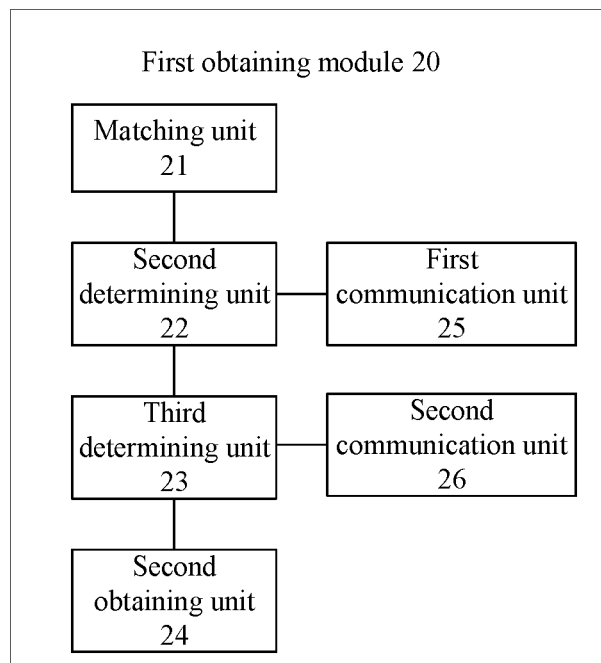
FIG. 10 illustrates a structural schematic of a first obtaining module provided by exemplary embodiments of the present disclosure.

Referring to FIG. 10, in one embodiment, the first obtaining module 20 may include a matching unit 21, a second determining unit 22, a third determining unit 23, and a second obtaining unit 24. The matching unit 21 may be configured to perform the matching process between the keyword information and the document names of the documents to be printed. The second determining unit 22 may be configured to determine whether there is a target document name matching the keyword information in the document names of the documents to be printed. If there is a target document name matching the keyword information in the document names of the documents to be printed, the third determining unit 23 may be configured to determine the quantity of target print documents corresponding to the target document name. If the quantity of target print documents corresponding to the target document name is 1, the second obtaining unit 24 may be configured to obtain the target print document.

In one embodiment, the first obtaining module 20 may further include a first communication unit 25. If there is no target document name matching the keyword information in the document names of the documents to be printed, the first communication unit 25 may be configured to transmit the first response information to the voice processing apparatus.

In one embodiment, the first obtaining module 20 may further include a second communication unit 26. If the quantity of target print documents corresponding to the target document name is greater than 1, the second communication unit 26 may be configured to transmit the second response information to the voice processing apparatus.

In one embodiment, the communication module 40 may be configured to determine the target image forming apparatus from the image forming apparatuses associated with the user's account according to the keyword information and the preset rule and to transmit the target print document and the print configuration information to the target image forming apparatus.

In one embodiment, the receiving module 10 may be further configured to receive the print result transmitted by the target image forming apparatus. The communication module 40 may be also configured to transmit the print result to the voice processing apparatus.

Various embodiments of the present disclosure provide a computer-readable storage medium containing a computer program, where when being executed, the computer program causes a processor to perform a method for controlling voice print.

Various embodiments of the present disclosure provide an apparatus for controlling voice print. The apparatus includes a memory, storing a computer program for performing a method for controlling voice print; and a processor, coupled with the memory and when the computer program being executed, configured to: receive keyword information extracted from voice information by a voice processing apparatus; obtain a target print document according to the keyword information; obtain print configuration information according to the keyword information; and transmit the target print document and the print configuration information to a target image forming apparatus.

Various embodiments of the present disclosure provide a non-transitory computer-readable storage medium containing a computer program, where when being executed, the computer program causes a processor to perform a method for controlling voice print. The method includes receiving keyword information extracted from voice information by a voice processing apparatus; obtaining a target print document according to the keyword information; obtaining print configuration information according to the keyword information; and transmitting the target print document and the print configuration information to a target image forming apparatus.

From the above-mentioned embodiments, it may be seen that the solutions provided by the present disclosure may achieve at least the following beneficial effects.

The keyword information extracted from the voice information by the voice processing apparatus may be received; the target print document and the print configuration information may be obtained according to the keyword information; and the target print document and the print configuration information may be transmitted to the target image forming apparatus. In such way, the target print document may be obtained according to the keyword information; and the print configuration information may be obtained according to the keyword information or according to preset stored information. Therefore, there is no need for the user to repeatedly reply to the voice for confirmation, the user may only need to send one print voice instruction to make the print device perform the print operation, and the interaction process may be simple, which greatly improves print efficiency. In addition, for multiple voices transmitted back and forth, if one of the voices is inaccurately converted, printing errors may be caused. Therefore, compared with the existing technology, using only one print voice instruction may reduce printing errors caused by inaccurate voice conversion. Moreover, even if there is an abnormal situation in the print device, the user may be informed by voice in time, which may make remote printing more convenient and reliable.

The technical features of above-mentioned embodiments may be combined arbitrarily. For brevity, all possible combinations of the technical features in above-mentioned embodiments may not be described. However, as long as there is no contradiction in the combination of these technical features, the technical features should be regarded as the scope described in the present disclosure.

Above-mentioned embodiments only represent certain embodiments of the present disclosure, and the descriptions thereof are relatively specific and detailed, but should not be construed as a limitation on the scope of the present disclosure. It should be noted that, for those skilled in the art, certain modifications and improvements may be made without departing from the concept of the present disclosure, which all belong to the protection scope of the present disclosure. Therefore, the protection scope of the present disclosure shall be subject to the appended claims.

What is claimed is:

1. A method for controlling voice print, comprising:
   receiving keyword information extracted from voice information by a voice processing apparatus;
   obtaining a target print document according to the keyword information, by:
      performing a matching process between the keyword information and document names of documents;
      determining whether there is a target document name matching the keyword information in the document names of documents;
      in response to that there is the target document name matching the keyword information in the document names of the documents, determining a quantity of target print documents corresponding to the target document name; and
      in response to that the quantity of the target print documents corresponding to the target document name is 1, obtaining the target print document;
   obtaining print configuration information according to the keyword information; and
   transmitting the target print document and the print configuration information to a target image forming apparatus.

2. The method according to claim 1, wherein obtaining the print configuration information according to the keyword information includes:
   deleting a keyword corresponding to a document name of the target print document in the keyword information to form remaining keyword information; and
   determining the print configuration information according to the remaining keyword information.

3. The method according to claim 1, wherein obtaining the target print document according to the keyword information further includes:
   in response to that there is no target document name matching the keyword information in the document names of the documents to be printed, transmitting first response information to the voice processing apparatus.

4. The method according to claim 1, wherein obtaining the target print document according to the keyword information further includes:
   in response to that the quantity of target print documents corresponding to the target document name is greater than 1, transmitting second response information to the voice processing apparatus.

5. The method according to claim 1, wherein transmitting the target print document and the print configuration information to the target image forming apparatus includes:
   according to the keyword information, determining a target image forming apparatus associated with a user's account, and transmitting the target print document and the print configuration information to the target image forming apparatus.

6. The method according to claim 1, further including:
   receiving a print result transmitted by the target image forming apparatus; and
   transmitting the print result to the voice processing apparatus.

7. An apparatus for controlling voice print, comprising: a memory, storing a computer program for performing a method for controlling voice print; and
   a processor, coupled with the memory and when the computer program being executed, configured to:
      receive keyword information extracted from voice information by a voice processing apparatus;
      obtain a target print document according to the keyword information, by:
         performing a matching process between the keyword information and document names of documents;
         determining whether there is a target document name matching the keyword information in the document names of documents;
         in response to that there is the target document name matching the keyword information in the document names of the documents, determining a quantity of target print documents corresponding to the target document name; and
         in response to that the quantity of the target print documents corresponding to the target document name is 1, obtaining the target print document;
      obtain print configuration information according to the keyword information; and
      transmit the target print document and the print configuration information to a target image forming apparatus.

8. The apparatus according to claim 7, wherein obtaining the print configuration information according to the keyword information includes:
- deleting a keyword corresponding to a document name of the target print document in the keyword information to form remaining keyword information; and
- determining the print configuration information according to the remaining keyword information.

9. The apparatus according to claim 7, wherein for obtaining the target print document according to the keyword information, the processor is further configured to:
- in response to that there is no target document name matching the keyword information in the document names of the documents to be printed, transmit first response information to the voice processing apparatus.

10. The apparatus according to claim 7, wherein for obtaining the target print document according to the keyword information, the processor is further configured to:
- in response to that the quantity of target print documents corresponding to the target document name is greater than 1, transmit second response information to the voice processing apparatus.

11. The apparatus according to claim 7, wherein for transmitting the target print document and the print configuration information to the target image forming apparatus, the processor is configured to:
- according to the keyword information, determine a target image forming apparatus associated with a user's account, and transmit the target print document and the print configuration information to the target image forming apparatus.

12. The apparatus according to claim 7, wherein the processor is further configured to:
- receive a print result transmitted by the target image forming apparatus; and
- transmit the print result to the voice processing apparatus.

13. A non-transitory computer-readable storage medium containing a computer program, wherein when being executed, the computer program causes a processor to perform a method for controlling voice print, the method comprising:
- receiving keyword information extracted from voice information by a voice processing apparatus;
- obtaining a target print document according to the keyword information, by:
  - performing a matching process between the keyword information and document names of documents;
  - determining whether there is a target document name matching the keyword information in the document names of documents;
  - in response to that there is the target document name matching the keyword information in the document names of the documents, determining a quantity of target print documents corresponding to the target document name; and
  - in response to that the quantity of the target print documents corresponding to the target document name is 1, obtaining the target print document;
- obtaining print configuration information according to the keyword information; and
- transmitting the target print document and the print configuration information to a target image forming apparatus.

14. The storage medium according to claim 13, wherein obtaining the print configuration information according to the keyword information includes:
- deleting a keyword corresponding to a document name of the target print document in the keyword information to form remaining keyword information; and
- determining the print configuration information according to the remaining keyword information.

15. The storage medium according to claim 13, wherein obtaining the target print document according to the keyword information further includes:
- in response to that the quantity of target print documents corresponding to the target document name is greater than 1, transmitting second response information to the voice processing apparatus.

16. The storage medium according to claim 13, wherein transmitting the target print document and the print configuration information to the target image forming apparatus includes:
- according to the keyword information, determining a target image forming apparatus associated with a user's account, and transmitting the target print document and the print configuration information to the target image forming apparatus.

17. The storage medium according to claim 13, wherein the method further includes:
- receiving a print result transmitted by the target image forming apparatus; and
- transmitting the print result to the voice processing apparatus.

* * * * *